(12) United States Patent
Drew

(10) Patent No.: US 6,360,945 B1
(45) Date of Patent: Mar. 26, 2002

(54) METHODS AND APPARATUS FOR EMPLOYING A HIDDEN SECURITY PARTITION TO ENHANCE SYSTEM SECURITY

(75) Inventor: Colin Drew, Dundee (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/324,633

(22) Filed: Jun. 2, 1999

(30) Foreign Application Priority Data

Jun. 16, 1998 (GB) .............................. 9812836

(51) Int. Cl.⁷ ................................ G06K 5/00
(52) U.S. Cl. ....................... 235/382; 711/173
(58) Field of Search ................ 235/379, 382; 711/170, 173, 163, 164, 112, 202, 206, 209

(56) References Cited

U.S. PATENT DOCUMENTS

| | | | |
|---|---|---|---|
| 5,012,514 A | * 4/1991 | Renton | 380/192 |
| 5,559,960 A | * 9/1996 | Lattvin | 395/186 |
| 5,564,040 A | * 10/1996 | Kubala | 711/173 |
| 5,666,540 A | * 9/1997 | Hagiwara et al. | 395/750.05 |
| 5,706,472 A | * 1/1998 | Ruff et al. | 711/173 |
| 5,930,831 A | * 7/1999 | Marsh et al. | 711/173 |

FOREIGN PATENT DOCUMENTS

| | | |
|---|---|---|
| GB | 2304213 | 3/1997 |
| GB | 2324179 | 10/1998 |
| WO | 9013084 | 11/1990 |
| WO | 9400936 | 1/1994 |

OTHER PUBLICATIONS

Derwent abstract 98–021767 and IE—76125.
Ranish Partition Manager, Review No. 17756 at www.softweek.com and development history at www.users.intercom.com/~ranish/part/history.htm.

* cited by examiner

Primary Examiner—Karl D. Frech
Assistant Examiner—Diane I. Lee
(74) Attorney, Agent, or Firm—Peter H. Priest

(57) ABSTRACT

An automated teller machine includes a processor on motherboard with BIOS on ROM which allows operation of hard disk via interface. The disk has at least one normal partition but also includes a hidden security partition not accessible under normal system control. Data relating thereto can be encoded for security reasons.

17 Claims, 4 Drawing Sheets

(a)

(b)

FIG. 3
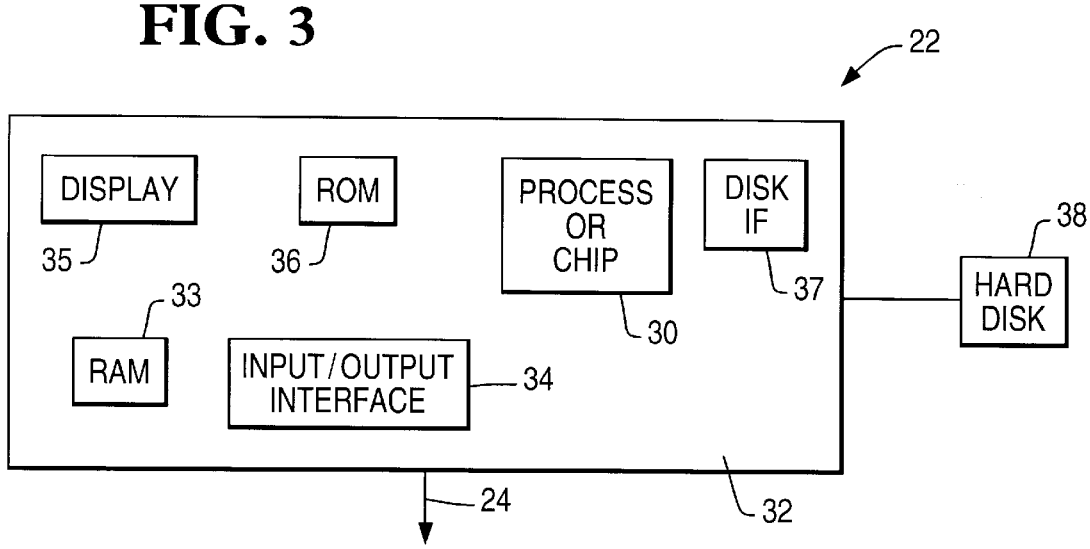
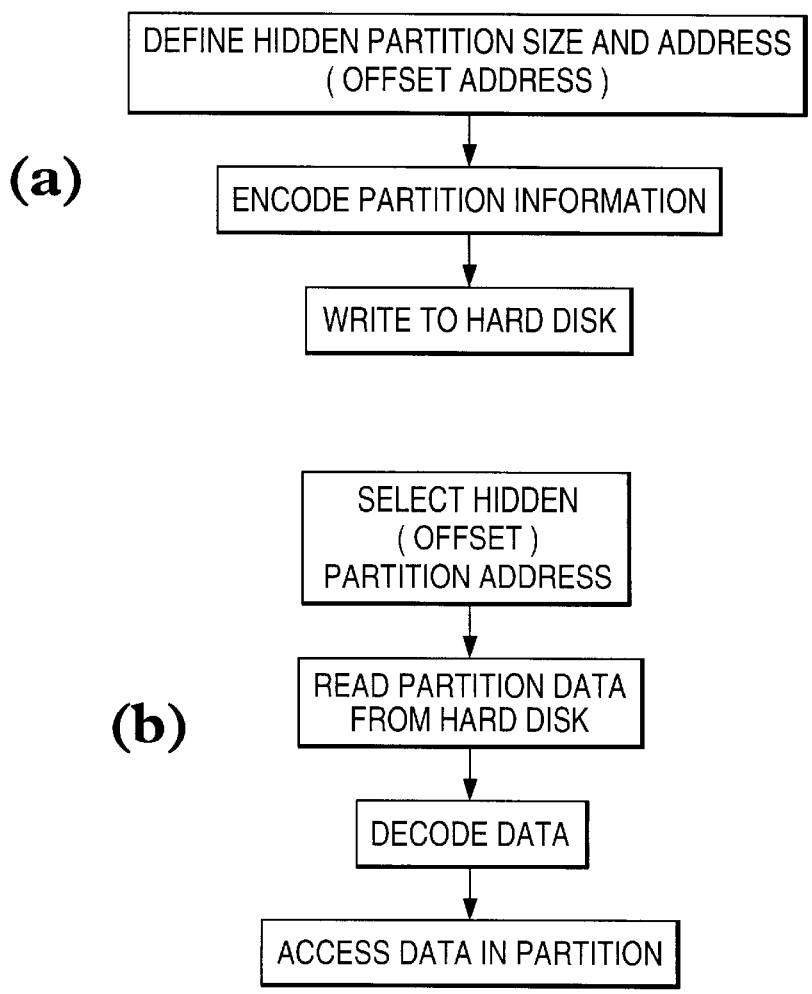
FIG. 6

```
Physical Sector:  Cyl 0, Side 0, Sector 1
00000000: FA 33 C0 8E D0 BC 00 7C -8B F4 50 07 50 1F FB FC  .3.....|..P.P...
00000010: BF 00 06 B9 00 01 F2 A5 -EA 1D 06 00 00 BE BE 07  ................
00000020: B3 04 80 3C 80 74 0E 80 -3C 00 75 1C 83 C6 10 FE  ...<.t..<.u.....
00000030: CB 75 EF CD 18 8B 14 8B -4C 02 8B EE 83 C6 10 FE  .u......L.......
00000040: CB 74 1A 80 3C 00 74 F4 -BE 8B 06 AC 3C 00 74 0B  .t..<.t.....<.t.
00000050: 56 BB 07 00 B4 0E CD 10 -5E EB F0 EB FE BF 05 00  V.......^.......
00000060: BB 00 7C B8 01 02 57 CD -13 5F 73 0C 33 C0 CD 13  ..|...W._s.3....
00000070: 4F 75 ED BE A3 06 EB D3 -BE C2 06 BF FE 7D 81 3D  Ou...........}.=
00000080: 55 AA 75 C7 8B F5 EA 00 -7C 00 00 49 6E 76 61 6C  U.u.....|..Inval
00000090: 69 64 20 70 61 72 74 69 -74 69 6F 6E 20 74 61 62  id partition tab
000000A0: 6C 65 00 45 72 72 6F 72 -20 6C 6F 61 64 69 6E 67  le.Error loading
000000B0: 20 6F 70 65 72 61 74 69 -6E 67 20 73 79 73 74 65   operating syste
000000C0: 6D 00 4D 69 73 73 69 6E -67 20 6F 70 65 72 61 74  m.Missing operat
000000D0: 69 6E 67 20 73 79 73 74 -65 6D 00 80 18 59 12 00  ing system...Y..
000000E0: 00 00 00 00 00 00 00 00 -00 00 00 00 00 00 00 00  ................
000000F0: 00 00 00 00 00 00 00 00 -00 00 00 00 00 00 00 00  ................
00000100: 00 00 00 00 00 00 00 00 -00 00 00 00 00 00 00 00  ................
00000110: 00 00 00 00 00 00 00 00 -00 00 00 00 00 00 00 00  ................
00000120: 00 00 00 00 00 00 00 00 -00 00 00 00 00 00 00 00  ................
00000130: 00 00 00 00 00 00 00 00 -00 00 00 00 00 00 00 00  ................
00000140: 00 00 00 00 00 00 00 00 -00 00 00 00 00 00 00 00  ................
00000150: 00 00 00 00 00 00 00 00 -00 00 00 00 00 00 00 00  ................
00000160: 00 00 00 06 3F BF 00 00 -00 00 00 00 00 C1 3C 20  ....?........<
00000170: 00 00 00 0B 3F 00 00 00 -00 00 00 00 00 00 00 00  ....?...........
00000180: 00 00 00 00 00 00 00 00 -00 00 00 00 00 00 00 00  ................
00000190: 00 00 00 00 00 00 00 00 -00 00 00 00 00 00 00 00  ................
000001A0: 00 00 00 00 00 00 00 00 -00 00 00 00 00 00 00 00  ................
000001B0: 00 00 00 00 00 00 00 00 -00 00 00 00 00 00 80 01  ................
000001C0: 01 00 06 3F BF 00 3F 00 -00 00 C1 3C 20 00 00 00  ...?..?....< ...
000001D0: 00 00 00 00 00 00 00 00 -00 00 00 00 00 00 00 00  ................
000001E0: 00 00 00 00 00 00 00 00 -00 00 00 00 00 00 00 00  ................
000001F0: 00 00 00 00 00 00 00 00 -00 00 00 00 00 00 55 AA  ..............U.
```

FIG. 4

```
Physical Sector: Cyl 0, Side 0, Sector 1
00000000: FA 33 C0 8E D0 BC 00 7C -8B F4 50 07 50 1F FB FC   .3.......|..P.P.
00000010: BF 00 06 B9 00 01 F2 A5 -EA 1D 06 00 00 BE BE 07   ................
00000020: B3 04 80 3C 80 74 0E 80 -3C 00 75 1C 83 C6 10 FE   ...<.t..<.u.....
00000030: CB 75 EF CD 18 8B 14 8B -4C 02 8B EE 83 C6 10 FE   .u......L.......
00000040: CB 74 1A 80 3C 00 74 F4 -BE 8B 06 AC 3C 00 74 0B   .t..<.t.....<.t.
00000050: 56 BB 07 00 B4 0E CD 10 -5E EB F0 EB FE BF 05 00   V.......^.......
00000060: BB 00 7C B8 01 02 57 CD -13 5F 73 0C 33 C0 CD 13   ..|...W.._s.3...
00000070: 4F 75 ED BE A3 06 EB D3 -BE C2 06 BF FE 7D 81 3D   Ou...........}.=
00000080: 55 AA 75 C7 8B F5 EA 00 -7C 00 00 49 6E 76 61 6C   U.u.....|..Inval
00000090: 69 64 20 70 61 72 74 69 -74 69 6F 6E 20 74 61 62   id partition tab
000000A0: 6C 65 00 45 72 72 6F 72 -20 6C 6F 61 64 69 6E 67   le.Error loading
000000B0: 20 6F 70 65 72 61 74 69 -6E 67 20 73 79 73 74 65    operating syste
000000C0: 6D 00 4D 69 73 73 69 6E -67 20 6F 70 65 72 61 74   m.Missing operat
000000D0: 69 6E 67 20 73 79 73 74 -65 6D 00 80 18 59 12 00   ing system...Y..
000000E0: 00 00 00 00 00 00 00 00 -00 00 00 00 00 00 00 00   ................
000000F0: 00 00 00 00 00 00 00 00 -00 00 00 00 00 00 00 00   ................
00000100: 00 00 00 00 00 00 00 00 -00 00 00 00 00 00 00 00   ................
00000110: 00 00 00 00 00 00 00 00 -00 00 00 00 00 00 00 00   ................
00000120: 00 00 00 00 00 00 00 00 -00 00 00 00 00 00 00 00   ................
00000130: 00 00 00 00 00 00 00 00 -00 00 00 00 00 00 00 00   ................
00000140: 00 00 00 00 00 00 00 00 -00 00 00 00 00 00 00 00   ................
00000150: 00 00 00 00 00 00 00 00 -00 00 00 00 00 00 00 00   ................
00000160: XX XX XX XX XX XX XX XX -XX XX XX XX XX XX XX XX   ................
00000170: 00 00 00 00 00 00 00 00 -00 00 00 00 00 00 00 00   ................
00000180: 00 00 00 00 00 00 00 00 -00 00 00 00 00 00 00 00   ................
00000190: 00 00 00 00 00 00 00 00 -00 00 00 00 00 00 00 00   ................
000001A0: 00 00 00 00 00 00 00 00 -00 00 00 00 00 00 00 00   ................
000001B0: 00 00 00 00 00 00 3F BF -00 00 00 00 C1 3C 20 00   ......?......<..?
000001C0: 01 00 06 3F BF 00 3F 00 -00 00 00 80 00 00 00 00   ...?..?.........
000001D0: 00 00 00 00 00 00 00 00 -00 00 00 00 00 00 00 00   ................
000001E0: 00 00 00 00 00 00 00 00 -00 00 00 00 00 00 00 00   ................
000001F0: 00 00 00 00 00 00 00 00 -00 00 00 00 00 00 55 AA   ..............U.
```

FIG. 5

METHODS AND APPARATUS FOR EMPLOYING A HIDDEN SECURITY PARTITION TO ENHANCE SYSTEM SECURITY

BACKGROUND OF THE INVENTION

The invention relates to data security arrangements.

When handling data, for example in a self service terminal such as an Automated Teller Machine (ATM), access needs to be restricted. When data is stored on a rotatable storage medium (e.g. a hard disk) there is a need to reduce the risk of unauthorized access.

The present invention is concerned with assisting in providing such security.

SUMMARY OF THE INVENTION

According to the invention there is provided a security method for a rotatable storage device characterized by providing a hidden security partition in the device, and wherein information on the position of the partition is stored on the device in such a manner as to prevent access by normal system operation.

In a preferred embodiment the method is employed in operating a self service terminal.

Further according to the invention there is provided a rotatable storage device having a storage sector for storing information on at least one storage partition and characterized by a hidden security partition located thereon and inaccessible during normal system operation.

In a preferred embodiment the device is employed in a self service terminal.

BRIEF DESCRIPTION OF THE DRAWINGS

The invention will now be described by way of example with reference to the accompanying drawings in which:

FIG. 3 shows the processor control aspect of an ATM in more detail;

FIG. 4 shows a typical partition table sector associated with the hard disk of FIG. 3;

FIG. 5 shows the inventive aspect of the hidden partition; and

FIG. 6 shows the store and access mechanisms respectively for the hidden partition.

DETAILED DESCRIPTION

Figure 1:
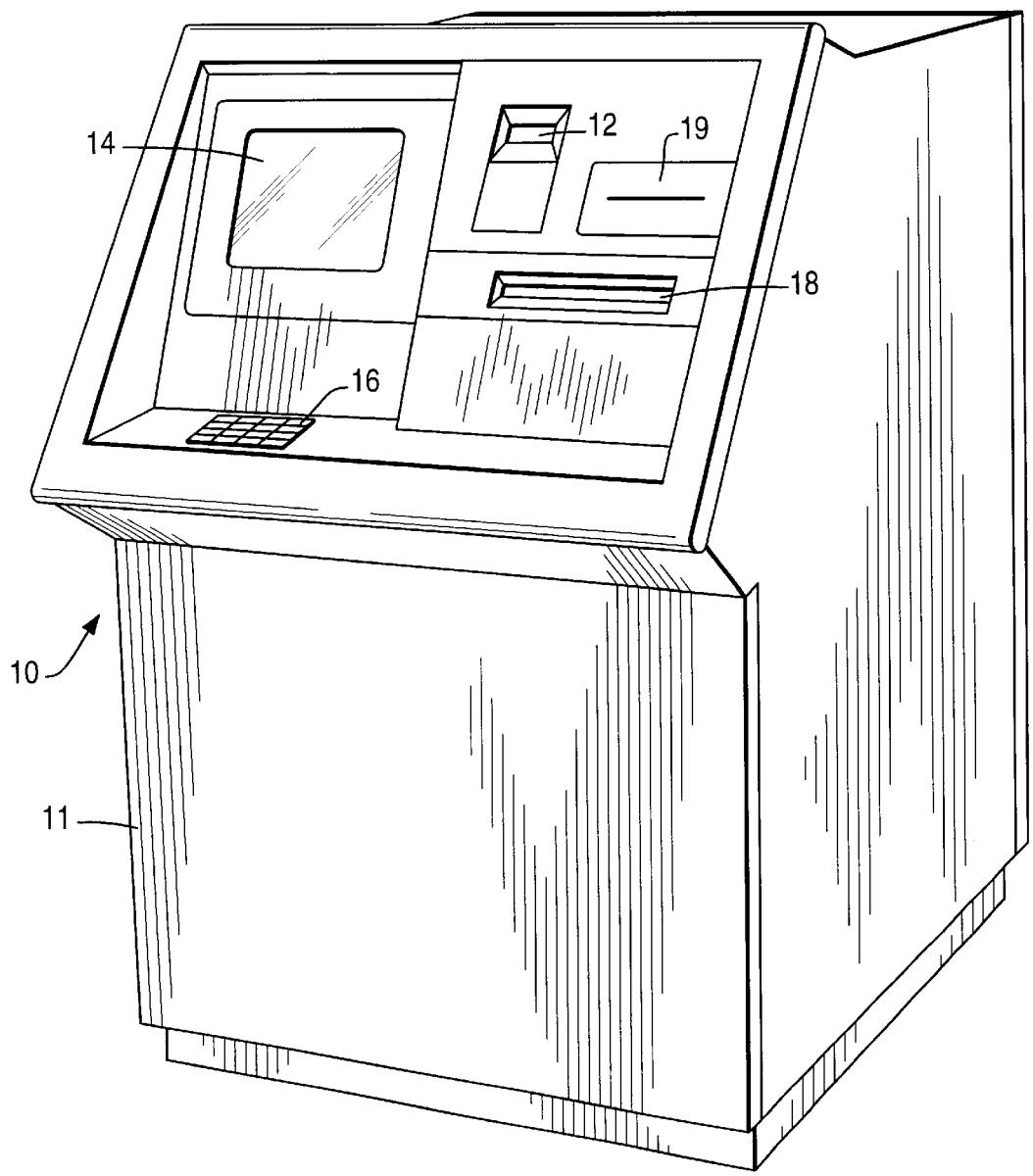
FIG. 1 shows a known ATM system.

In the typical ATM arrangement of FIG. 1, the ATM 10 is enclosed within a cabinet 11 and has customer utilization arrangements such as a magnetic card input slot 12, a display screen 14, a keypad 16, a cash delivery slot 18 and a balance and/or payout slip delivery slot 19.

Figure 2:
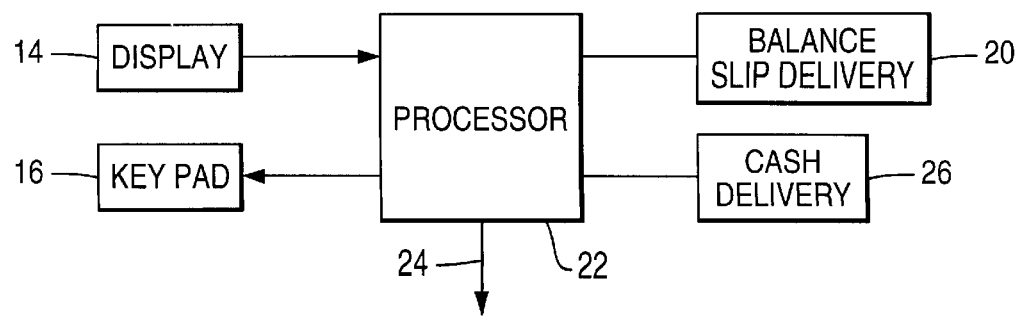
FIG. 2 shows the control system for the FIG. 1 arrangement.

The control system for the ATM 10 is shown in FIG. 2 in which a processor 22 is connected to receive input from the card reader 12 and keypad 16, to control the display 14 and to control a cash counting and delivery system 26 connected to the cash delivery slot 18. A paper slip delivery system 20 is provided for dispensing a printed payout slip, account balance or the like, connected to the delivery slot 19. The processor is connected by a connector 24 to the central authorization system of the financial institution operating the ATM 10.

In the FIG. 2 arrangement it is necessary to access, handle and store data and the processor arrangement 22 is shown in more detail in FIG. 3. Typically the processor will include a number of components to allow the system to operate. The heart of the processor will be a microprocessor chip 30 mounted on a motherboard 32. Input and output information/control will pass via interface 34 and driving the display will be achieved by display driver 35. Memory chips 33 (RAM) provide immediate data handling capability.

Other memory chips 36 (ROM) provide operational information in permanent form. A disk interface 37 provides connection to a hard disk 38 through its disk controller (not shown separately).

The devices except the hard disk 38 are all shown mounted on the motherboard for simplicity, but some devices may be situated on separate cards mounted on the motherboard.

A hard disk 38 provides large scale storage for the computer and will carry software to run the system as well as data regarding transactions and the like. The motherboard BIOS (Basic Input Output System) allows the system to operate correctly including hard disk operation. This BIOS is accessed at the commencement of the boot up program and the BIOS is typically held in the ROM 35 (and possibly partially in the disk controller 37).

For the computer to bootstrap (boot) after internal self checks, the ROM BIOS checks the hard drive at a specific location for 'system files' and reads data stored on the disk's first sector and copies this to RAM to allow the stored system files to be loaded into RAM.

During the computer system operation, when data is to be read from a file, the operating system instructs the hard disk controller to move the drive head to the drive's file allocation table (FAT) to determine where the start of that file begins so that the correct file can be accessed.

Security of information on ATMs is paramount to both the Financial Institutions and the customer in the street. To protect this information system/procedures require to be in place to restrict/control access to the software and data present on the ATM's hard drive 38. This includes restricting system boot up if certain security criterion are not met.

During the normal software initialization of a hard disk, partitions are laid down in the first sector of a disk, known as the Partition Table Sector. Within this first sector there is a defined area called the Partition Table where up to four 16 byte partition entries can be written. This information details where each partition is located on the disk, how big it is and whether the partition can be used to boot the system. The Motherboard BIOS within the system indexes into this Partition Table to find the boot partition and then loads the boot sector code pointed to by the boot partition and subsequently loads the system software. A typical Partition Table Sector from a disk is shown in FIG. 4.

The Partition Table Sector has a storage capacity of 16×32 (512 bytes). The bootstrap code is at the beginning (commencing at address 00000000) with Partition Table entries towards the end of the sector. Each Partition Table entry requires 16 bytes of data. As illustrated the first Partition Table entry (shown in bold) commences as address 000001B0. Up to four partitions may be required on large disks and each 16 byte entry can follow on from each other up to the end of the sector. Thereafter bytes '55 AA' denote to the computer BIOS that the Partition Table contains valid data.

In the present invention we have now included a Security Partition above the area where the standard partition entry information is placed, utilizing space within the Partition Table Sector, so that it will not be recognized by the normal operating system as a hidden partition.

The Security Partition data details the whereabouts of the special hidden partition on the disk. Since Operating Systems currently only use the defined Partition Table area to detail partition information the Security Partition would be unknown and therefore inaccessible to other users. The Security Partition details can also be encoded such that it was not obvious that the data was describing a hidden disk partition. This hidden partition can then contain proprietary code and information used to implement secure access to the system software and data.

FIG. 5 again shows a partition table but it now includes hidden Security Partition data within the Partition Table Sector. The normal partition information is again written at address 000001B0. However, unused space above the area recognized as giving partition information is employed for security partition data. In this example the offset address 00000160 is used and data indicative of the partition is stored (shows as XX bytes). Only knowledge of the offset of the hidden Security Partition data entry within the Partition Table Sector and the encoding algorithm would allow the hidden partition to be found.

Hence to set up the Security Partition the appropriate partition defining information can be laid down at the offset address by means of the steps shown in FIG. 6a. Access can be made using the steps shown in FIG. 6b, which is outside the accessibility of the normal operating system.

During installation of the ATM build suite the Partition Table Sector would be written with the encoded hidden Security Partition. Only the manufacturer's proprietary software/firmware would have knowledge of the encoding algorithm and the offset address of the hidden partition data. The software load of data onto the disk could include loading any security information into the hidden partition on the disk. Access to which would only be achieved through special proprietary software and firmware routines. The motherboard BIOS could also be modified to include special routines to access the hidden partition to validate security data before allowing the system to boot. Hence this additional security measure restricts/controls access to the software and data on the hard disk and includes restricting system boot up if certain security requirements are not met.

In the arrangement shown in FIG. 3 the disk 38 is an IDU disk. In a variation, for use with an SCSI disk, the disk interface 37 is replaced by an SCSI controller.

What is claimed is:

1. A security method for a rotatable storage device, the method comprising the steps of:
    (a) providing a hidden security partition in the device;
    (b) storing information on the position of the partition on the device in such a manner as to prevent access by normal system operation;
    (c) storing security data on the hidden partition; and
    (d) on startup of a system employing the rotatable storage device, validating the security data and preventing system startup if validation fails, validation occurring without a need to examine security information external to the rotatable storage device.

2. A method according to claim 1, wherein the hidden partition position information is stored at a location remote from information relating to any non-security partition.

3. A method according to claim 1, wherein the hidden partition position information is stored in a partition table at a location away from other non-security partition information within the same partition table.

4. A method according to claim 1, wherein the information on the hidden partition is security encoded prior to storage to prevent interpretation even when subject to unauthorized access.

5. A rotatable storage device comprising:
    a hidden security partition containing security data, for validation during startup of a system including the rotatable storage device, startup being halted if validation fails, validation occurring without a need to examine security information external to the rotatable storage device; and
    a storage sector for storing information identifying a location of the security partition, the storage sector being inaccessible during normal system operation.

6. A rotatable storage device according to claim 5, wherein position information on the hidden security partition is stored at a location remote from information relating to any non-security partitions.

7. A rotatable store device according to claim 5, wherein information on the hidden security partition is security encoded to prevent interpretation in the event that it is subject to unauthorized access.

8. A method of operating a self-service terminal having a rotatable storage device, the method comprising the steps of:
    (a) providing a hidden security partition in the rotatable storage device;
    (b) storing information on the position of the partition on the device in such a manner as to prevent access by normal system operation;
    (c) storing security data on the hidden partition; and
    (d) on startup of the terminal, validating the security data and preventing system startup if validation fails, validation occurring without a need to examine security information external to the rotatable storage device.

9. A method according to claim 8, wherein the hidden partition position information is stored at a location remote from information relating to any non-security partition.

10. A method according to claim 8, wherein the hidden partition position information is stored in a partition table at a location away from other non-security partition information within the same partition table.

11. A method according to claim 8, wherein the information on the hidden partition is security encoded prior to storage to prevent interpretation even when subject to unauthorized access.

12. A self-service terminal comprising:
    a processor;
    a display;
    a dispenser operable in response to an authorized user request; and
    a rotatable storage device including a storage sector for storing information on at least one storage partition, the storage sector having a hidden security partition located thereon and inaccessible during normal system operation, the hidden security partition containing security data for validation by the processor during startup of the terminal, the processor being operative to halt startup if validation fails, validation occurring without a need to examine security information external to the rotatable storage device.

13. A self-service terminal according to claim 12, wherein position information on the hidden security partition is stored at a location remote from information relating to any non-security partitions.

14. A self-service terminal according to claim 12, wherein information on the hidden security partition is security encoded to prevent interpretation in the event that it is subject to unauthorized access.

15. An automated teller machine (ATM) comprising:
a dispenser for dispensing cash in response to an authorized user request; and a rotatable storage device including a storage sector for storing information on at least one storage partition, the storage sector having a hidden security partition located thereon and inaccessible during normal system operation, the hidden security partition containing security data for validation by the processor during startup of the ATM, the processor being operative to halt startup if validation fails, validation occurring without a need to examine security information external to the rotatable storage device.

16. An ATM according to claim 15, wherein position information on the hidden security partition is stored at a location remote from information relating to any non-security partitions.

17. An ATM according to claim 15, wherein information on the hidden security partition is security encoded to prevent interpretation in the event that it is subject to unauthorized access.

* * * * *